Oct. 16, 1934.  R. A. HAYWARD  1,977,060
WRAPPER OR PACKAGE
Filed July 10, 1933  2 Sheets-Sheet 1

INVENTOR
Ralph A. Hayward
BY
ATTORNEYS

Oct. 16, 1934.   R. A. HAYWARD   1,977,060
WRAPPER OR PACKAGE
Filed July 10, 1933    2 Sheets-Sheet 2
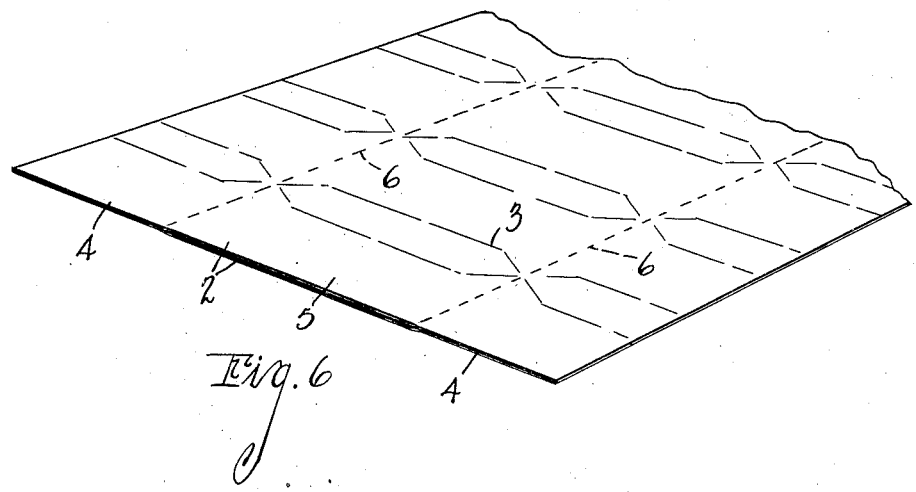
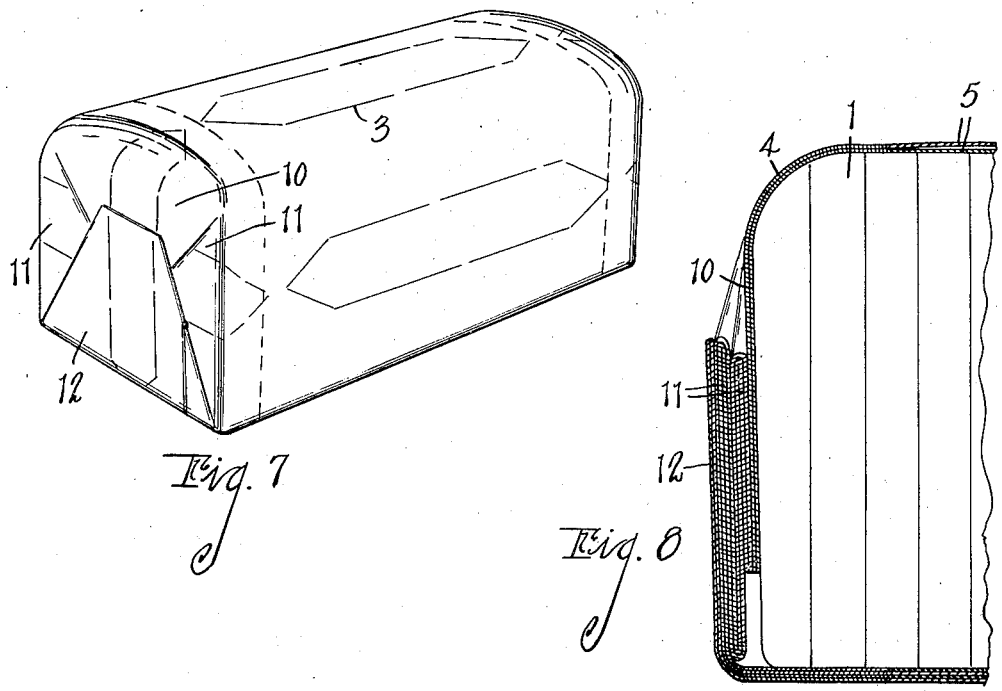
INVENTOR
Ralph A. Hayward
BY
Chappell & Earl
ATTORNEYS Patented Oct. 16, 1934

1,977,060

UNITED STATES PATENT OFFICE 1,977,060

WRAPPER OR PACKAGE

Ralph A. Hayward, Parchment, Mich., assignor to Kalamazoo Vegetable Parchment Company, Parchment, Mich.

Application July 10, 1933, Serial No. 679,698

7 Claims. (Cl. 229—87)

The main objects of this invention are:

First, to provide an improved wrapper which is well adapted for the wrapping of bread, particularly sliced bread, which effectively holds the slices in assembled relation and at the same time presents a yielding top portion or top portion permitting the determining of the condition of the contents of the wrapper by the "feel".

Second, to provide a multi-sheet or multi-ply wrapper which may be effectively used in standard types of wrapping machines now in quite general use—for example, in the wrapping of bread or other articles.

Third, to provide an improved wax wrapper having these advantages which may be very effectively sealed under conditions such as commonly exist in the wrapping of bread and like articles.

Fourth, to provide an improved package, such for example, as for an enclosed loaf of sliced bread or other article consisting of a plurality of assembled parts.

Objects relating to details and economies of my invention will appear from the description to follow. The invention is defined and pointed out in the claims.

A structure which is a preferred embodiment of my invention is illustrated in the accompanying drawings, in which:

Fig. 6 is a perspective view of a slight modification of my improved wrapper as embodied for certain types of wrapping machines.

Fig. 7 is a perspective view of a loaf of bread having the wrapper shown in Fig. 6 applied thereto.

Fig. 8 is an enlarged fragmentary section on a line corresponding to line 8—8 of Fig. 7.

In the accompanying drawings, 1 represents a loaf of sliced bread, my improved wrapper being especially desirable for wrapping sliced bread although it is advantageous for use with unsliced bread and various other articles where multi-ply sheets or wrappers are desirous.

It has been the practice to some extent to employ trays to receive the sliced loaf, the wrapper being placed around these trays. This practice is quite largely superseded by the practice of using double wrappers, or two sheets, but such wrappers present difficulties in wrapping and uniformity of result is not had, and further, the wrapped articles are likely to have an untidy appearance and still do not posses the desired strength.

My improved wrapper comprises a pair of super-imposed sheets 2 of wax paper, the outer sheet preferably having a suitable design thereon as indicated at 3. These sheets have marginal portions 4 thereon of substantial width sealed together by means of the wax carried by the sheets. This is accomplished by feeding the strips of paper into a machine in superimposed relation, the machine applying heat as by means of rollers or shoes to the marginal strips which it is desired to seal together so that the sheets are united by means of the wax throughout the marginal strip portions thereof, leaving the central portions 5 of the sheets unconnected or free from each other. This sealing of the marginal portions together very materially stiffens the marginal portions; that is, the sealed marginal portions are substantially stiffer than the two-ply unsealed central portion.

Figure 1:
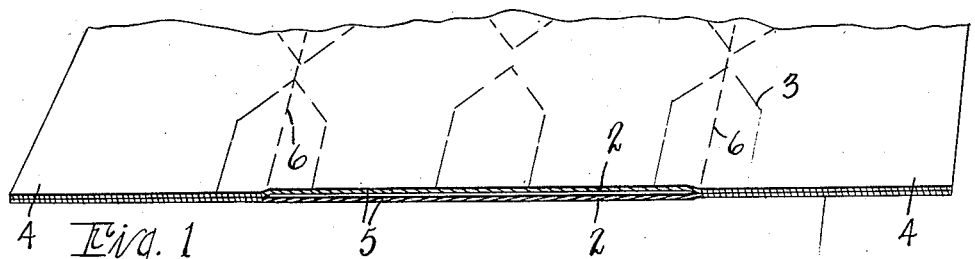
Fig. 1 is a fragmentary perspective view of a wrapper embodying my invention.
Figure 2:
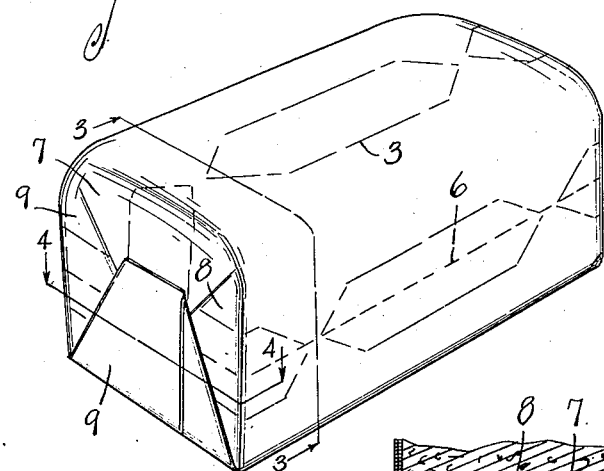
Fig. 2 is a perspective view of a package embodying my invention or an article such as a loaf of bread wrapped therein.
Figure 4:
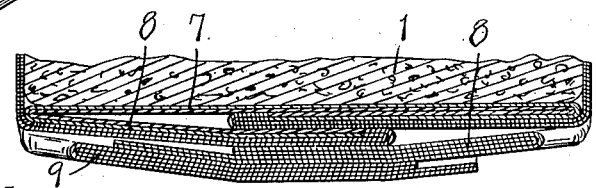
Fig. 4 is an enlarged horizontal section on line 4—4 of Fig. 2.
Figure 3:
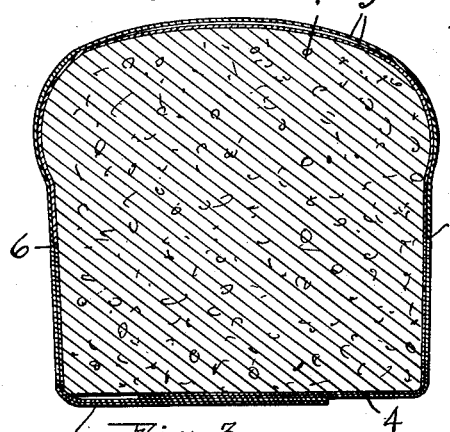
Fig. 3 is a cross section on line 3—3 of Fig. 2.
Figure 5:
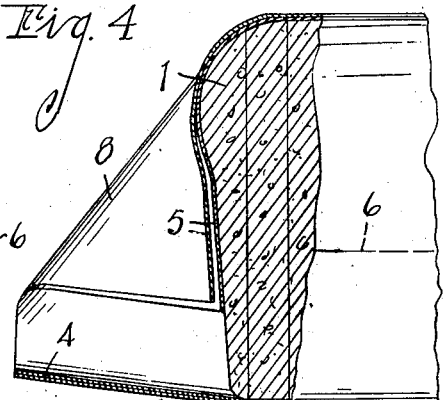
Fig. 5 is a fragmentary view partially in section illustrating certain of the steps applying the wrapper to a loaf of sliced bread.

When the wrapper is applied to a sliced loaf of bread, I preferably arrange the wrapper with the sealed marginal strip portions thereof longitudinally of the wrapper and overlapping on the underside of the loaf, as shown in Fig. 3, the unsealed or free portions of the flap being at the top of the loaf. Dotted lines 6 indicate the inner edges of the sealed marginal strips. The ends of the wrapper are folded upon the ends of the loaf (see Figs. 3 and 4) in which 7 indicates the top flap, 8 the side flap and 9 the bottom flap, the particular fold illustrated being highly desirable for sliced loaves, the manner of folding the flaps, however, being old in the art.

An important feature of the invention is, however, that the superimposed sheets having been sealed along their marginal portions previous to the operations thereon of the wrapping and sealing machines, the air spaces between the various plies are very materially reduced so that a more effective sealing is had and the degree of heat necessary for effective sealing is also materially reduced. It will be understood that no attempt is made in the drawings to show the parts in their relative proportions, the thickness of the sheets being greatly exaggerated.

With the wrapper formed and arranged on the article as shown in Figs. 1 to 5 inclusive, the result is a wrapper having a relatively stiff bottom portion and a relatively or comparatively soft top portion so that the contents of the loaf may be determined by "feel" which is the common practice of purchasers of wrapped bread to determine its freshness; at the same time the loaf is fully protected and the package is very secure as the slices are held in place without likelihood of slipping one upon the other or a feeling of limpness or insecurity in the package which is common with sliced wrapped packages where a single wrapper is used or even where double wrappers are used.

Further, my improved wrapper does not result in clogging of the wrapping machines now in very general use and neat folding and effective sealing is possible without substantial modification of such machines.

In the embodiment of my invention shown in Figs. 6, 7 and 8, I illustrate my improved wrapper as it is applied by certain machines having a side feed. In this embodiment, the wrapper is fed with the sealed portions transversely of the loaf and constituting all of the overlapping flaps as shown in Fig. 8. 10 is the top flap, 11 the side flaps and 12 the bottom flap. The same advantage is here had of minimizing the air spaces between the overlapped flaps so that a more effective sealing is possible. In this embodiment, the end portions of the loaf or article wrapped are very strong and the advantage of a soft top portion is had although not the full advantage of a stiff bottom portion such as results from the application of the wrapper as shown in Figs. 1 to 5.

While I have indicated a sliced loaf in Fig. 8, the wrapper applied as in Figs. 7 and 8 is more suitable for an unsliced loaf or for articles other than bread where a multi-ply wrapper is desired for more perfect exclusion of moisture or greater security.

While I refer to the wrapper as comprising superimposed sheets, it will be understood that in the manufacture, the wrappers will be formed in long strips and commonly sold in rolls the same as other wrapping paper, the wrappers being severed from the strips in proper or desired lengths.

I have not attempted to illustrate or describe various embodiments or adaptations of my improvements as it is believed that this disclosure will enable those skilled in the art to embody or adapt the same as may be desired.

Having thus described my invention, what I claim as new and desire to secure by Letters Patent, is:

1. A package comprising a sliced loaf of bread, and a wrapper therefor comprising superimposed sheets of wax coated paper having opposed marginal portions thereof of substantial width sealed together by the wax of the sheets, the sheets other than said sealed marginal portions being free from each other, the wrapper being wrapped upon the sliced loaf with the sealed marginal portions of the wrapper disposed longitudinally of the loaf and in overlapping relation on the bottom thereof, and the unsealed portion at the top of the loaf, the wrapper being folded into overlapping closure flaps at the end of the loaf, the overlapping portions being sealed together by the wax carried by the sheets whereby the wrapper has a relatively stiff bottom portion and a soft top portion.

2. A package comprising a sliced loaf of bread, and a wrapper therefor comprising superimposed sheets of wax coated paper having opposed marginal portions thereof of substantial width sealed together by the wax of the sheets, the sheets other than said sealed marginal portions being free from each other, the wrapper being wrapped upon the sliced loaf with the unsealed portion at the top of the loaf, the wrapper being folded into overlapping closure flaps at the end of the loaf, the overlapping portions being sealed together by the wax carried by the sheets.

3. A package comprising a loaf of bread, and a wrapper comprising a plurality of sheets laid together face to face, and means securing said sheets together exclusively along opposed marginal side portions thereof, the wrapper being wrapped upon the sliced loaf of bread with the disconnected portions at the top thereof and the connected portions overlapping under the bottom of the loaf, and means sealing the overlapping bottom portions.

4. A package comprising the relatively soft compressible loaf to be wrapped, and a wrapper therefor comprising superimposed sheets of wax coated paper having opposed marginal portions thereof of substantial width sealed together, the sheets other than said sealed marginal portions being free from each other, the wrapper being wrapped upon the loaf with the sealed marginal portions of the wrapper disposed longitudinally of the loaf and in overlapping relation on the bottom thereof, and the unsealed portion at the top of the loaf, the wrapper being folded into overlapping closure flaps at the end of the loaf.

5. A package comprising a relatively soft compressible article to be wrapped, and a wrapper therefor comprising superimposed sheets of wax coated paper having opposed marginal portions thereof of substantial width sealed together by the wax of the sheets, the wrapper being wrapped upon the article with the sealed marginal portions of the wrapper in overlapping relation on the bottom thereof, and the unsealed portion at the top of the article, the wrapper being folded into overlapping closure flaps at the end of the article, the overlapping portions being sealed together by the wax carried by the sheets whereby the wrapper has a relatively stiff bottom portion and a soft top portion.

6. A package comprising a sliced loaf of baked goods, and a wrapper therefor comprising superimposed sheets of paper having opposed marginal portions thereof of substantial width sealed together, the sheets other than said sealed marginal portions being free from each other, the wrapper being wrapped upon the sliced loaf with the sealed marginal portions of the wrapper disposed longitudinally of the loaf and in overlapping relation on the bottom thereof, and the unsealed portion at the top of the loaf, the wrapper being folded into overlapping closure flaps at the end of the loaf, the overlapping portions being sealed together by the wax carried by the sheets whereby the wrapper has a relatively stiff bottom portion and a soft top portion.

7. A package comprising a sliced loaf of baked goods, and a wrapper therefor comprising superimposed sheets of paper having opposed marginal portions thereof of substantial width sealed together, the sheets other than said sealed marginal portions being free from each other, the wrapper being wrapped upon the sliced loaf with the unsealed portion at the top of the loaf, the wrapper being folded into overlapping closure flaps at the end of the loaf, the overlapping portions being sealed together.

RALPH A. HAYWARD.